(12) United States Patent
Cahill et al.

(10) Patent No.: US 12,281,959 B2
(45) Date of Patent: *Apr. 22, 2025

(54) FIBER SPAN CHARACTERIZATION UTILIZING PAIRED OPTICAL TIME DOMAIN REFLECTOMETERS

(71) Applicant: II-VI Delaware, Inc., Wilmington, DE (US)

(72) Inventors: Michael J. Cahill, Hampton (AU); Ian Peter McClean, Brixham (GB)

(73) Assignee: II-VI Delaware, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/530,940

(22) Filed: Dec. 6, 2023

(65) Prior Publication Data

US 2024/0110845 A1   Apr. 4, 2024

Related U.S. Application Data

(63) Continuation of application No. 17/528,317, filed on Nov. 17, 2021, now Pat. No. 11,885,707.

(51) Int. Cl.
*G01M 11/00* (2006.01)
*H04B 10/071* (2013.01)

(52) U.S. Cl.
CPC .... *G01M 11/3145* (2013.01); *G01M 11/3127* (2013.01); *G01M 11/3181* (2013.01); *H04B 10/071* (2013.01)

(58) Field of Classification Search
CPC .. G01M 11/30; G01M 11/31; G01M 11/3109; G01M 11/3118; G01M 11/3127;
(Continued)

(56) References Cited

U.S. PATENT DOCUMENTS 5,479,251 A   12/1995 Hanson
5,966,207 A   10/1999 Haskins
(Continued)

FOREIGN PATENT DOCUMENTS

WO   WO-2020168833   8/2020
WO   WO-2021203751   10/2021

*Primary Examiner* — Gordon J Stock, Jr.
(74) *Attorney, Agent, or Firm* — Wendy W. Koba

(57) ABSTRACT

A system for providing advanced characterization of an optical fiber span is based upon the use of a pair of optical time domain reflectometers (OTDRs), located at opposing end terminations of the span being characterized. Each OTDR performs standard reflectometry measurements and transmits the resulting OTDR trace to monitoring equipment in a typical manner. The pair of OTDR traces is thereafter combined in a particular manner ("stitched together") to create an OTDR trace of the entire fiber span (essentially doubling the operational range of prior art OTDR measurement capabilities). The transmit portion of one OTDR may be paired with the receive portion of the other OTDR, with time-of-light measurements (or signal loss measurements) used to determine optical path length and/or optical signal loss of the span. Using a multi-wavelength light source in the paired transmit/receive arrangement allows for a characterization of chromatic dispersion of the span.

11 Claims, 9 Drawing Sheets

(58) Field of Classification Search
CPC ......... G01M 11/3136; G01M 11/3145; G01M 11/3154; G01M 11/3163; G01M 11/3172; G01M 11/3181; G01M 11/319; G01M 11/33; G01M 11/331; G01M 11/332; G01M 11/333; G01M 11/334; G01M 11/335; G01M 11/336; G01M 11/337; G01M 11/338; H04B 10/071

See application file for complete search history.

(56) References Cited

U.S. PATENT DOCUMENTS

| | | |
|---|---|---|
| 6,650,406 B1 | 11/2003 | Allard et al. |
| 6,798,500 B2 | 9/2004 | Wilson et al. |
| 7,011,453 B1 | 3/2006 | Harres |
| 7,099,581 B2 | 8/2006 | Evangelides, Jr |
| 8,395,763 B2 | 3/2013 | Clawson |
| 8,417,113 B1 | 4/2013 | Harres |
| 8,792,091 B2 | 7/2014 | McClean et al. |
| 9,134,197 B2 | 9/2015 | L'Heureux |
| 9,363,011 B2 | 6/2016 | McClean et al. |
| 9,391,695 B2 | 7/2016 | Piehler |
| 9,494,484 B2 | 11/2016 | Gurusami et al. |
| 9,825,700 B2 | 11/2017 | Ruchet |
| 9,948,058 B2 | 4/2018 | McClean et al. |
| 10,014,935 B2 | 7/2018 | Perron |
| 10,148,383 B2 | 12/2018 | Cahill |
| 10,161,798 B2 | 12/2018 | Pei et al. |
| 10,161,829 B2 | 12/2018 | Brillhart |
| 10,237,633 B2 | 3/2019 | Chedore et al. |
| 10,247,605 B2 | 4/2019 | Chalmers |
| 10,277,311 B2 | 4/2019 | Archambault et al. |
| 10,371,596 B2 | 8/2019 | L'Heureux et al. |
| 10,411,796 B1 | 9/2019 | Archambault et al. |
| 10,432,302 B1 | 10/2019 | Delgado et al. |
| 10,547,378 B2 | 1/2020 | Chang |
| 11,201,667 B2 | 12/2021 | Archambault |
| 11,405,102 B1 | 8/2022 | Cahil |
| 11,408,801 B2 | 8/2022 | Roux |
| 11,431,408 B2 | 8/2022 | Roux |
| 11,515,938 B2 | 11/2022 | Barrier |
| 11,885,707 B2 * | 1/2024 | Cahill ................ G01M 11/3127 |
| 2002/0176070 A1 | 11/2002 | Achtenhagen et al. |
| 2018/0266808 A1 | 9/2018 | Shaar |
| 2019/0049338 A1 | 2/2019 | Xu |
| 2022/0321212 A1 | 10/2022 | Cahill |
| 2023/0106273 A1 | 4/2023 | Zhou |

\* cited by examiner

FIBER SPAN CHARACTERIZATION UTILIZING PAIRED OPTICAL TIME DOMAIN REFLECTOMETERS

CROSS-REFERENCE TO RELATED APPLICATIONS

This application claims the priority of U.S. patent application Ser. No. 17/528,317, filed Nov. 17, 2021 and herein incorporated by reference.

TECHNICAL FIELD

The inventive concepts described in detail below are related to the characterization of the transmission properties of optical fiber as provided through the use of optical time domain reflectometers (OTDRs).

BACKGROUND OF THE INVENTION

OTDRs have been used extensively to determine optical fiber characteristics such as attenuation, reflections, and the like, in order to optimize the working levels of associated transmitter and receiver equipment. An OTDR module typically includes an optical source used to generate optical pulses that are injected into the fiber being analyzed, and an optical receiver for detecting light from the optical source that is back-reflected by the fiber. An associated processing module utilizes the timing information of the input pulse train and the optical power in the return back-reflected light to create an output (typically referred to as an OTDR trace) that defines the overall loss along the fiber span, as well as an identification of physical changes/reflection points (e.g., connectors, splices, and the like) along the measured span.

While extremely useful in both installation and monitoring of optical fiber links between network nodes, the operational range of OTDRs is limited by the amount of optical power that may be launched into a given optical fiber, as well as the length of the fiber span itself.

SUMMARY OF THE INVENTION

The advanced fiber characterization capabilities provided by the system of the present invention are based upon the utilization of a pair of OTDRs, disposed at opposite terminations of a given fiber span, to address the operational range limitations of the prior art, while also supplying measurements of additional fiber characteristics beyond those associated with a conventional OTDR trace output.

In accordance with the principles of the present invention, a separate OTDR module is located at either termination of a defined optical fiber link (also referred to at times as a "fiber span", or simply a "link" or "span"). Each OTDR performs standard reflectometry measurements and transmits the results to monitoring equipment in a typical manner. The pair of OTDR standard traces may then be combined in a particular manner ("stitched together") to create an OTDR trace of the entire fiber span (essentially doubling the operational range of prior art OTDR measurement capabilities). In particular and as discussed in detail below, the traces may be combined in either the time domain or the loss domain to create a composite trace that provides an end-to-end characterization of the complete fiber span.

Inasmuch as each OTDR includes both a transmit component and a receive component, a communication channel may be created along the fiber span between a transmit component in a first OTDR and a receive component in a second OTDR. Test signals transmitted along this communication channel may be used to determine the optical link length, as well as the optical signal loss across the link. The paired OTDR apparatus of the present invention may also be used to provide wavelength-dependent characteristics of the fiber span (e.g., chromatic dispersion, Raman gain) by the inclusion of a multi-wavelength transmitter in one of the OTDR modules. Measurements of polarization-dependent loss may also be provided by configuring at least one OTDR module to include a polarization controller with the transmit component. Using a combination of both a polarization controller and a multi-wavelength light source of optical probes provides all of these measurement capabilities, as well as the ability to determine the differential group delay (DGD) and polarization mode dispersion (PMD) of the fiber span being evaluated.

An exemplary embodiment of the present invention may take the form of a system for characterizing an optical fiber span that uses a pair of OTDRs, one located at each termination of the fiber span under consideration. The pair of OTDRs may be referred to as a near-end OTDR and a far-end OTDR, the near-end OTDR including a near-end light source for injecting an optical probe into the optical fiber span, a near-end receive component for measuring back-reflected light exiting the optical fiber span, and a near-end processing module for generating a near-end OTDR trace of optical power loss along a y-axis as a function of the optical fiber span path length along an x-axis. The far-end OTDR is coupled to a far-end termination of the optical fiber span and includes a far-end light source for injecting an optical probe into the optical fiber span, a far-end receive component for measuring back-reflected light exiting the optical fiber, and a far-end processing module for generating a far-end OTDR trace of optical power loss along a y-axis as a function of the optical fiber span path length along an x-axis. The near-end and far-end processing modules are configured to control the activation of the near-end and far-end OTDRs such that only one OTDR is operational at any point in time. The system also includes a characterization element in communication with both the near-end OTDR and the far-end OTDR, the characterization element being configured to estimate a span-based parameter from a combination of the near-end back-reflected light measurements and the far-end back-reflected light measurements for then combining the near-end OTDR trace with the far-end OTDR trace in a trace-stitching procedure using a mid-point of the span-based parameter as a stitching point to create as an output an end-to-end OTDR trace that characterizes the optical fiber span.

An exemplary method of creating an end-to-end OTDR trace of a given optical fiber span, in accordance with the principles of the present invention, may include the steps of: (1) performing a first OTDR procedure from a first, near-end termination of the optical fiber span, using a near-end OTDR module and generating therefrom a near-end OTDR trace; (2) performing a second OTDR procedure from a second, far-end termination of the optical fiber span, using a far-end OTDR module and generating therefrom a far-end OTDR trace; (3) estimating an optical path length (or optical signal loss) of the optical fiber span; (4) defining an OTDR trace stitching point as a mid-point of the estimated optical length (loss); (5) starting at the stitching point of the far-end OTDR trace, identify loss values for a set of individual span locations from the stitching point to the far-end termination of the optical fiber span; (6) adding an inverse of each identified loss value to the near-end OTDR trace to form a combined OTDR trace of the optical fiber span; and (7)

inserting anomalies present in the far-end OTDR trace at defined locations into the combined OTDR trace, forming as an output the end-to-end OTDR trace of the optical fiber span.

Other and further aspects and embodiments of the present invention will become apparent during the course of the following discussion and by reference to the accompanying drawings.

BRIEF DESCRIPTION OF THE DRAWINGS

Referring now to the drawings, where like numerals represent like components in several views.

DETAILED DESCRIPTION

Figure 1:
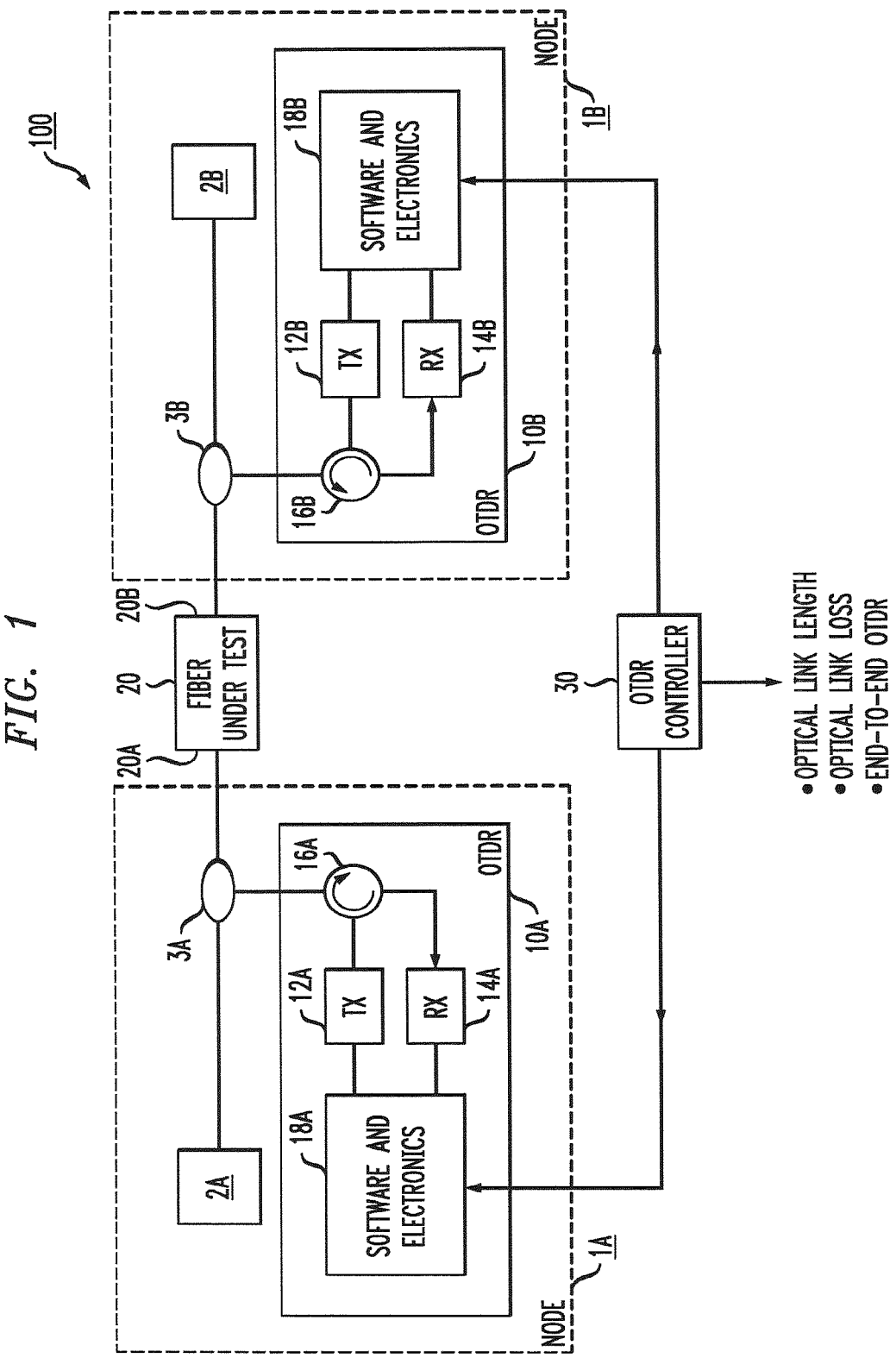
FIG. 1 illustrates an exemplary advanced OTDR system in accordance with the principles of the present invention, utilizing a paired arrangement of separate OTDR modules.

FIG. 1 illustrates an exemplary advanced OTDR system 100 in accordance with the principles of the present invention, utilizing a pair of OTDRs 10A, 10B to perform extensive testing and monitoring of a fiber link 20 disposed between OTDR 10A and OTDR 10B. While not required for practicing the inventive techniques, OTDRs 10A, 10B are typically located in a pair of optical nodes 1A, 1B (respectively) that include conventional optical communication equipment represented by elements 2A, 2B. A pair of optical switches, couplers, or wavelength-dependent multiplexers 3A, 3B are included in each node 1A, 1B and may be used to couple an associated OTDR to fiber link 20 in order to perform fiber characterization measurements. It is noted that a like reference numeral is used to define like components in OTDRs 10A and 10B, with an identifier "A" and "B" included in the drawings for the sake of context; the identifier not included in this detailed description for the sake of clarity and conciseness.

Each OTDR 10 includes a light source 12 for providing the optical probe signal that is coupled into fiber link 20 and used in a manner well-understood in the art to create back-reflected light in the return direction that is used to generate an OTDR trace as the output from OTDR 10. In many cases, the optical probe signal takes the form of an optical pulse train, but other types of optical probe signals (e.g., continuous-wave signal, a digital signal having a particular coding scheme, etc.).

An optical receiver 14 (e.g., photodetector) is also located in each OTDR 10 and used to measure the back-reflected light created by the optical probe as it propagates along fiber link 20. In this particular configuration, an optical circulator (or coupler) 16 is used to control/direct the signal flows between transmitter light source 12, receiver 14, and fiber link 20. Various other arrangements may be used to control the directions of the propagating signals without affecting the inventive techniques as described below. Each OTDR 10 also includes a processing module 18 that functions in a well-known manner to develop the OTDR trace output based upon the reflection measurements performed by receiver 14. At times, OTDR 10A may be referred to as the "near-end" OTDR and OTDR 10B may be referred to as the "far-end" OTDR.

In accordance with the principles of the present invention, the operation of OTDRs 10A, 10B is controlled such that only one module is performing OTDR measurements at any given point in time. Otherwise, having an optical probe signal propagate from both ends of fiber link 20 would result in creating interference between the two probe signals and prevent the collection of useful data for characterizing the fiber. In many cases, processing modules 18A, 18B may communicate with each other over an established communication channel (as discussed below) to share scheduling/monitoring information (for example) and avoid the possibility of both OTDRs attempting to obtain reflectometry measurements at the same time. Alternatively, an internal controller timing element (not shown) may be included in each OTDR and used to schedule the functionality of the components in accordance with the principles of the present invention.

In yet other embodiments, a separate (perhaps network-based) OTDR controller 30 may be included within advanced OTDR system 100 and used to control the operation of the OTDRs, where for example controller 30 may be used to transmit "start" and "stop" commands to each OTDR 10A, 10B to prevent the possibility of simultaneous OTDR measurement sequences. Controller 30 may be used to activate opposing pairs of "optical probe"/receiver to perform the time-of-flight measurement (signal loss calculation, for example) to determine the optical path length. Additionally, controller 30 may include the processing capability discussed below to combine the OTDR traces generated by processing modules 18 and provide as an output a detailed characterization of fiber link 20. OTDR controller 30 may be operated by a network management system, using well-known techniques.

For the purposes of explanation, it is presumed that an OTDR measurement process is initiated by controller 30 sending a command signal to near-end OTDR 10A to "start" the procedure. In this particular configuration, a control signal path (which may be an electronic signal path, a wireless RF path, or the like) is shown between controller 30 and processing module 18A, since module 18A is generally used to control the operation of light source 12A. Upon receipt of the "start" command, light source 12A directs an optical probe signal along fiber like 20. Light source 12A is configured to generate the optical probe at a pre-defined optical wavelength, and if taking the form of a train of optical pulses light source 12A is further configured to produce the pulse train at a predetermined pulse rate. Reflections from the optical probe are measured by receiver 14A and sent to processing module 18A. The propagating optical probe signal will continue to be transmitted and the reflections measured until near-end OTDR 10A receives a command from controller 30 (and/or processing module 18A) to "stop" the measurement process.

Figure 2:
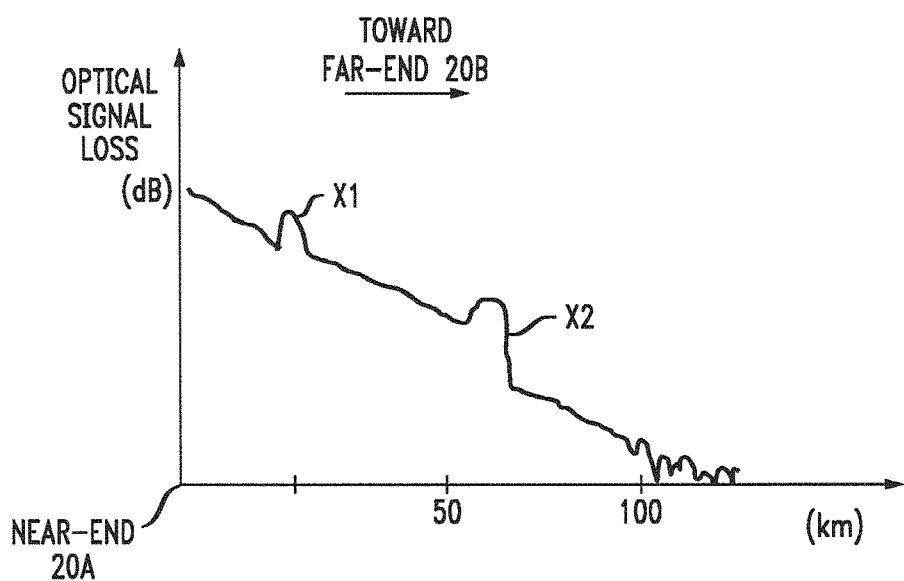
FIG. 2 shows a typical OTDR trace as created by a first OTDR of the paired arrangement of separate OTDR modules, providing fiber characterization from a first end (e.g., "near-end") of a given optical fiber span.

FIG. 2 shows a typical OTDR trace that is created by processing module 18A upon compiling the reflection measurements from receiver 14A in a known manner. The trace (referred to at times hereafter as OTDR trace A) illustrates optical power loss (in dB) as a function of distance along fiber link 20. Here, the span is measured in kilometers (km), with the origin defined as a first termination 20A of fiber link 20 (that is, the near-end location where the optical probe is coupled into fiber link 20). A spike X1 (i.e., a reflection point) is shown to have been identified at a location at a first distance from origin 20A, with a transition X2 (attributed to a bulk optical loss) shown at a position further along the fiber span. Reviewing the results shown in FIG. 2, it is clear that the operational range of OTDR 10A is about 110 km, since any measurements made beyond this point are consumed within the system noise floor. The operational range of an OTDR is known to be limited by factors such as, but not limited to, the optical power of the transmitted optical probe signal, as well as the amount of receiver noise (the combination of these factors determining the SNR of the back-reflected light).

The results shown in FIG. 2 are thus typical of conventional OTDR systems, providing necessary information on the properties of a portion of a fiber span. If the span is relatively short (say, 100 km or less), it is possible that the entire span may be characterized by this single OTDR procedure. However, without an a priori knowledge of the span length or signal loss, it is not possible to determine how much of the complete fiber link has been characterized using the single OTDR arrangement of the prior art.

The impediments to fiber span characterization based upon the limited operational range of a conventional OTDR module is addressed by the inventive advanced OTDR system, which utilizes a paired configuration of near-end and far-end OTDRs in a manner that allows for the complete span to be characterized. In accordance with the principles of the present invention a second, separate OTDR measurement is performed, this time using a far-end OTDR 10B located at the opposite end of fiber link 20. That is, OTDR 10B is used to create a trace that characterizes fiber link 20 starting from opposing endpoint (i.e., "far-end") termination 20B, looking "backwards" toward near-end termination 20A. Again, OTDR controller 30 may be used to send "start" and "stop" commands to OTDR 10B, along a signal path to processing module 18B, to control the transmission of the optical probe from light source 12B along fiber link 20 and the measurement of back-reflected light by receiver 14B. Alternatively, as discussed above, an established communication channel between processing modules 18A, 18B (or embedded OTDR controllers, not shown) may work together to control the activation of OTDR 10B once OTDR 10A is no longer sending an optical probe along fiber link 20.

Figure 3:
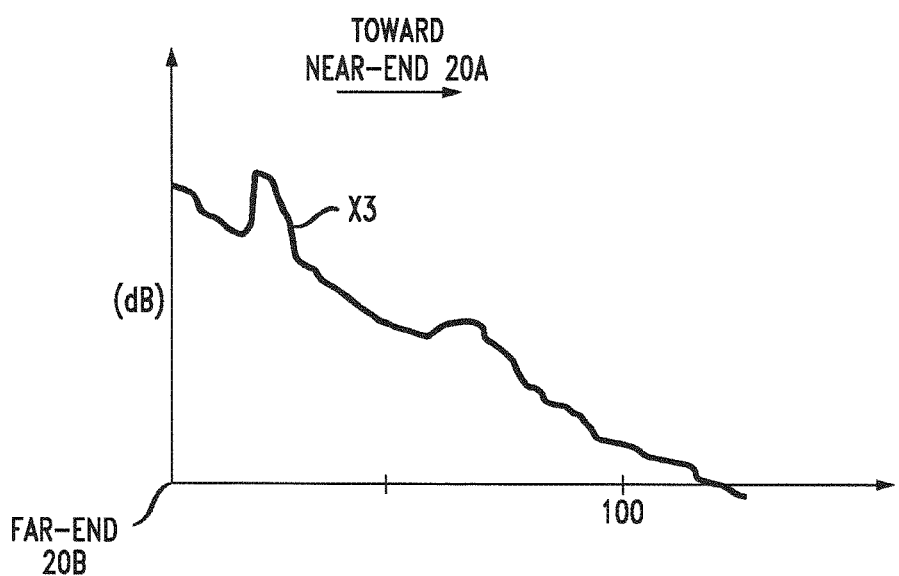
FIG. 3 shows a typical OTDR trace as created by a second OTDR of the paired arrangement of separate OTDR modules, providing fiber characterization from a second end (e.g., "far-end") of a given optical fiber span.

FIG. 3 illustrates an OTDR trace (denoted for the purposes of the present invention as OTDR trace B) that may be generated by far-end processing module 18B at the completion of the measurement process. The starting point for OTDR trace B is shown as far-end termination 20B of fiber link 20 and progresses along fiber link 20 toward near-end termination 20A. OTDR trace B shows the presence of a spike X3 (due to a reflection) at a location immediately beyond starting far-end termination 20B. Again, the operational range of the measurement capabilities of OTDR 10B is clearly represented by the degradation in useful measurements upon reaching the noise floor level. Presuming that both OTDRs exhibit similar functionality, the operational range of each module will be essentially the same.

In order to properly combine the data presented in these OTDR traces, either the optical span length L or optical signal loss P of fiber link 20 must be known (or estimated as best as possible). Advantageously, the paired OTDR modules of the present invention may be used to determine both the optical length, as well as optical loss, of fiber link 20 and thereafter use this information to create the end-to-end OTDR result. That is, by knowing one of these span-based values (length or loss), one trace may be reversed with respect to the other and positioned to coincide with an endpoint defined by the span length or loss values.

Turning to a description of a methodology for determining the span-based length or loss values (and as briefly mentioned above), a communication channel may be established between the paired OTDRs that allows for an exchange of information with respect to, for example, signal timing, measured power, and the like. The shared information may then be used to derive either optical span length L or optical signal loss P. For example, accurate timing/synchronization of the paired OTDRs may be provided upon establishment of the communication channel, and may then be used to estimate the optical span length L and/or optical signal loss P.

One technique for determining the optical length of the span is to measure the total time for light to traverse fiber link 20, denoted $\Delta t_{span}$ and referred to at times as a "time of flight" measurement. If both OTDRs 10A, 10B operate using the same system clock (e.g., upon establishment of the communication channel between the paired devices), it is possible to control near-end light source 12A and far-end receiver 14B (or the opposite pairing of far-end light source 12B and near-end receiver 14A) to measure the propagation interval of the transmitted optical probe. For example, if there is a 1 ms time interval measured from "transmit" to "receive", it can be presumed that the link has an optical length L of about 200 km. This 200 km span length may be used below at times as an exemplary span length when discussing various features of the inventive OTDR system, with the understanding that this example value is in no way limiting.

A determination of the optical signal loss P may be created by measuring both the transmit power at light source 12A and the received power at receiver 14B. Calculating the difference between these two power levels defines the power loss $P_{AB}$, which may thereafter be used in combination a power loss measured in the opposite direction $P_{BA}$ (i.e. from light source 12B to near-end receiver 14A) to determine an optical signal loss P of fiber link 20.

Once either the optical span length L or optical signal loss P is known, it is possible to "stitch together" the information in OTDR traces A, B to form an end-to-end trace that fully characterizes the entire span. Accomplishing this stitching proceeds by "reversing" the information presented in one of the OTDR traces with respect to the other, and then shifting the location of the reversed trace until the pair of traces display either the estimated values of L or P. FIGS. 4-9 illustrate the details of this approach.

Figure 4:
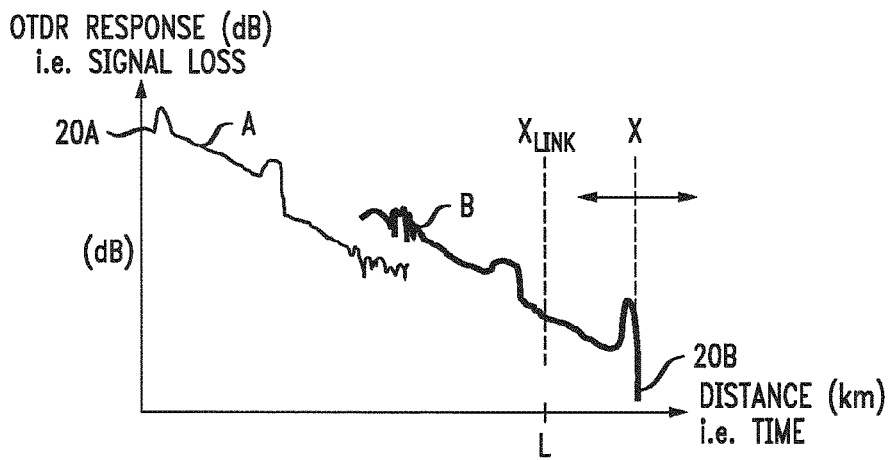
FIG. 4 demonstrates an initial step in stitching together the traces of FIGS. 2 and 3, forming a "reversed" version of one of the traces and using an estimated optical path length to properly position the start location of the reversed trace.
Figure 5:
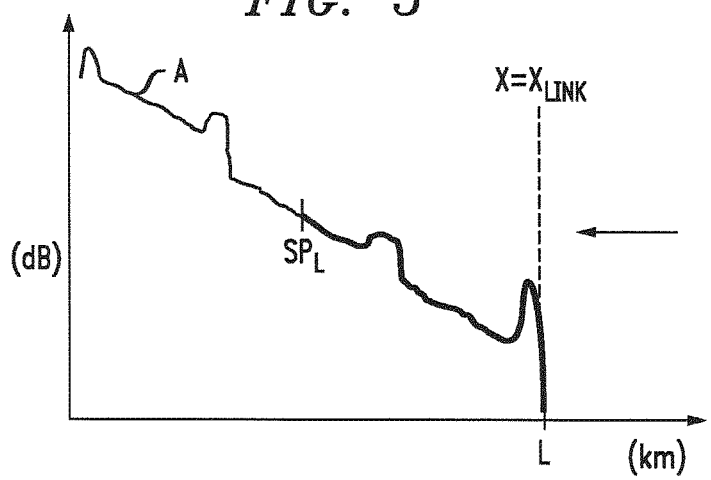
FIG. 5 shows a next step for the stitching process as shown in FIG. 4, illustrating the relocation of the starting point of the reversed trace in FIG. 3 and the identification of the "stitching point" based upon the relocation of the reversed trace.
Figure 6:
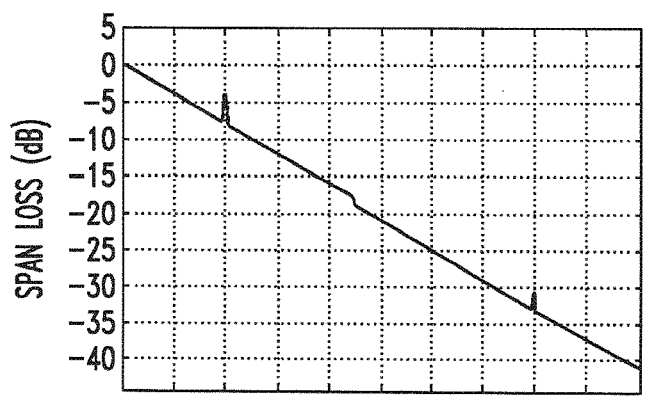
FIG. 6 is an end-to-end OTDR trace formed by reversing the magnitude of the second trace to form the final result, describing the complete fiber span.

In particular, FIGS. 4-6 illustrate a process of stitching together OTDR traces A, B based upon knowing the optical link length L. FIG. 4 illustrates a first step in the process of combining the OTDR traces, which includes "reversing" one trace relative to the other. In this example, OTFR trace B is reversed. For the purposes of the present invention, reversal involves changing the sign of the measured losses (starting at end point termination 20B) from negative to positive values, resulting in the upward trend of the trace moving from end point termination 20B toward endpoint termination 20A).

Also shown in FIG. 4 is the marked location of the derived optical span length L. With OTDR trace B reversed and the derived optical link length L noted, OTDR trace B is re-positioned until its starting point (i.e., far-end termination 20B) lines up with span length L, as shown in FIG. 5. This is possible since it is known a priori that data collection for OTDR trace B is initiated at this defined endpoint termination 20B. The result as shown in FIG. 5 defines a length-based "stitching point" $SP_L$ intermediate of the two end-points, where the traces meet. With stitching point SP L determined, the final step in stitching-together process of creating an end-to-end OTDR is to reverse the loss magnitude of OTDR trace B, resulting in the end-to-end OTDR trace as shown in FIG. 6, which properly characterizes the complete fiber span. Obviously, trace B may also be used as the primary trace, with trace A reversed and incorporated into trace B using this same approach. It is to be understood that if a given fiber span is extremely long (e.g., many hundreds of kms), the doubling of the operational range may be insufficient to fully characterize a middle portion of the span that is beyond the range of the OTDR measurements as performed from each endpoint.

Figure 7:
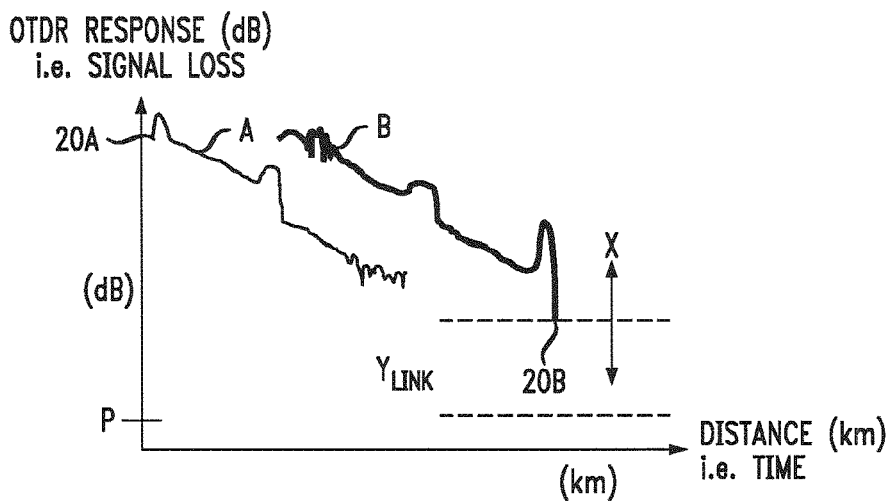
FIG. 7 demonstrates an initial step in alternative method of stitching together the traces of FIGS. 2 and 3, in this case based upon the estimated optical signal loss.
Figure 8:
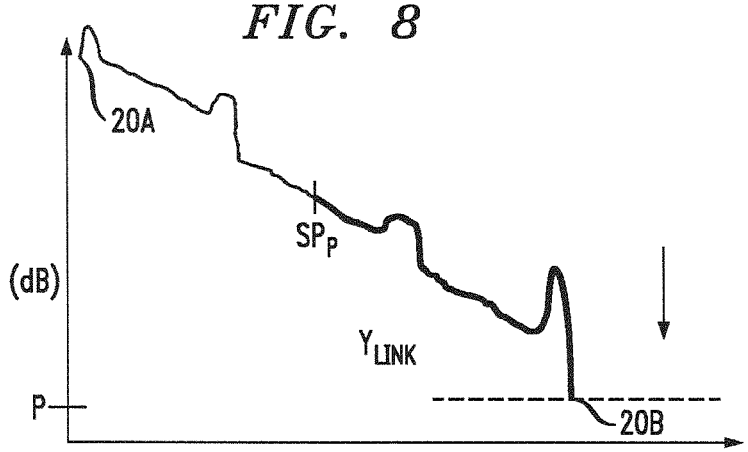
FIG. 8 shows a following step in the process as associated with FIG. 7, where the reversed trace is moved to position its start location to coincide with the optical signal loss, and again defining a "stitching point" where the two traces meet.
Figure 9:
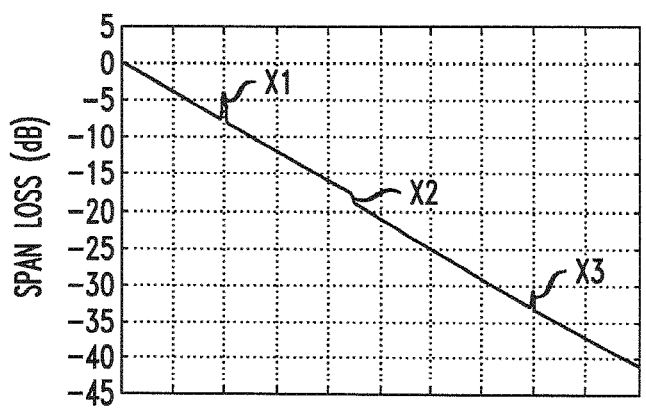
FIG. 9 is an end-to-end OTDR trace formed by reversing the magnitude of the trace values beyond the stitching point.

As mentioned above, the calculated link loss P may be used instead of the determined fiber span length to stitch together the pair of OTDR traces. FIGS. 7-9 illustrate a process of stitching together OTDR traces A, B based upon knowing the optical signal loss P across the span. Similar to the plots shown in FIG. 4, FIG. 7 illustrates both OTDR traces A, B from FIGS. 2 and 3, with the values for OTDR trace B reversed in the same manner. In this case, the derived value of optical signal loss P is marked along the y-axis and reversed trace B is shifted in position until its starting point is aligned with this known loss value. FIG. 8 illustrates the result of this movement of reversed trace B, denoting a loss-based stitching point SP P where the two traces meet along the y-axis direction. In order to form the end-to-end trace, the next step is similar to that described above with the length-based approach; namely, the data points along the trace B section are reversed in value, arriving at the desired end-to-end OTDR result shown in FIG. 9. While there may be slight differences between the end-to-end OTDR traces shown in FIG. 6 and FIG. 9, they are considered minimal and due to variations involved in determining the total optical path length or total optical signal loss.

In further accordance with the principles of the present invention, a paired arrangement of OTDRs may be used to provide additional characterizations of a fiber span by using a combination of a transmitter light source in a first OTDR with a receiver component in a second OTDR (as used in the manner described above to determine the optical path length and/or optical signal loss of the fiber span) to form a communication channel. For example, the use of a transmitter/receiver combination in a paired OTDR configuration may be used to provide wavelength-dependent and/or polarization-dependent characteristics of the fiber span.

Figure 10:
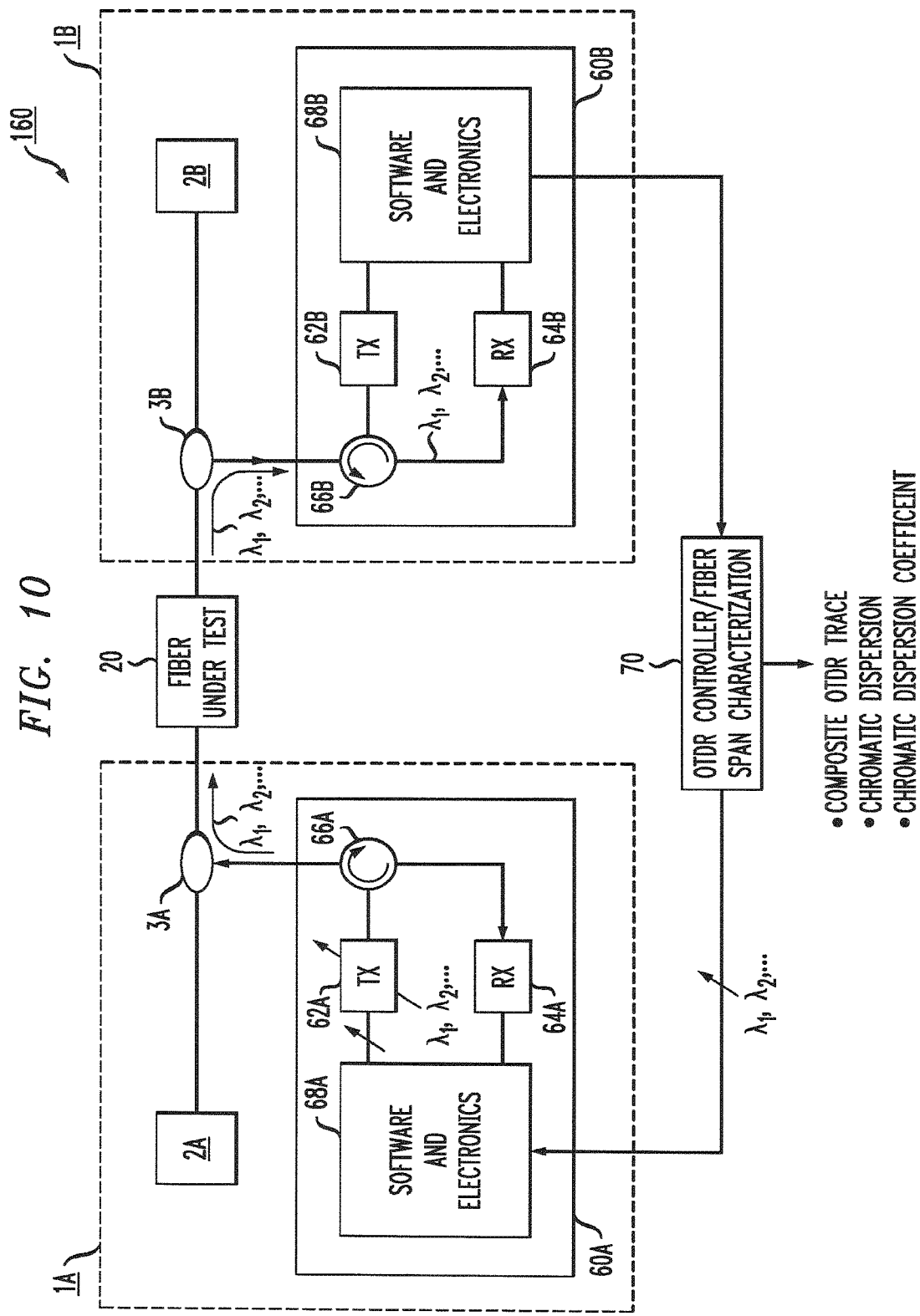
FIG. 10 illustrates an alternative embodiment of the present invention, in this case incorporating a multi-wavelength light source (here, a tunable wavelength source) within at least one OTDR module of the paired arrangement of OTDR modules, utilized for providing wavelength-dependent measures of optical path length (related to the fiber's chromatic dispersion characteristic) and optical path loss (e.g., a Raman gain profile)

FIG. 10 shows an alternative advanced OTDR system 160 formed in accordance with the present invention to determine wavelength-dependent characteristics of fiber link 20. In particular, advanced OTDR system 160 is able to perform measurements of wavelength-dependent changes in both the optical path length and optical path loss of fiber link 20, based upon using wavelength-dependent transmissions from a near-end OTDR module to a far-end OTDR module (or vice versa). It is to be understood that these properties of fiber link 20 are measured by advance OTDR system 160 in addition to generating the end-to-end OTDR trace created in the manner discussed. Similar to the embodiment as described, each OTDR module 60 includes a light source 62 for producing the optical probe, a receiver 64, and processing module 68 (with perhaps a circulator/coupler 66 controlling signal path directions). An associated fiber characterization element 70 may be used in a manner similar to OTDR controller 30 discussed above to control the operation of OTDRs 60A, 60B to generate OTDR traces and produce therefrom a "end-to-end" OTDR trace that characterizes fiber span 20. Otherwise, processing modules 68 (or embedded controllers) may be particularly configured to control the multi-wavelength testing of fiber link 20.

In the particular arrangement as shown in FIG. 10, near-end light source 62A is configured as a multi-wavelength laser source that is capable of providing an optical probe at selected wavelengths, under the control of processing module 68A. In order to create wavelength-based measurements, far-end receiver 64B is used to measure the optical power of the optical probe as a function of wavelength. While in most cases light source 62B is similarly configured as a multi-wavelength source, it is not required for collecting the wavelength-dependent information. However, inasmuch as near-end light source 62A will be communicating with far-end receive component 64B to perform the wavelength-dependent testing of fiber link 20, receive component 64B may be configured to exhibit a sufficiently broad response (in terms of bandwidth) so that an accurate wavelength-dependent response is observed at the far end of fiber link 20.

The pairing of near-end light source 62A with far-end receive component 64B is thus used in accordance with this embodiment of the present invention to perform measurements of wavelength-dependent optical path length (i.e., chromatic dispersion properties) and also, if required, wavelength-dependent measurements of optical path loss (associated with creating a Raman gain profile for fiber link 20). Chromatic dispersion occurs since optical signals operating at different wavelengths propagate at different speeds along a section of optical fiber. Therefore, using a similar methodology as discussed above to determine the optical length of fiber link 20 (for defining the "stitching point"), receive component 64B may be used in combination with processing module 68B to ascertain an arrival time for an optical probe operating at a given wavelength. Thus, after transmitting optical probes at a set of different wavelengths within the wavelength range of light source 62A, a set of arrival times (associated with each individual optical probe wavelength) is collected. These values may be used by processing module 68B (or sent to fiber characterization component 70) to determine the chromatic dispersion of fiber link 20, which is a measure of time arrival delay as a function of wavelength (typically measured as ps/nm). By also knowing the length of the span (as determined by time-of-flight, loss measurements, or the like, as discussed above), the chromatic dispersion coefficient, which is a measure of chromatic dispersion per km of fiber (ps/nm-km), may also be determined. The chromatic dispersion values may be plotted as a function of wavelength, with the derivative of this plot being an alternative way to describe and define the chromatic dispersion coefficient associated with the fiber span under evaluation.

In applications where fiber link 20 is used as a distributed Raman amplifier, it is useful to know its gain profile as a function of wavelength. Additionally, accurate monitoring of the net gain on a recurring basis is important to ensure and maintain an acceptable level of OSNR for all wavelength channels. The paired combination of multi-wavelength light source 62A and broadband receiver 64B may be used to perform this measurement. In some cases, a "pilot tone" from light source 62A may be injected into fiber link 20 along with the actual optical signal traffic. Alternatively, if the propagating WDM signals are affected by pilot tones, coded signals (such as CDMA, for example) may be used to reduce the signal power while ensuring sufficient received power to properly characterized the gain profile. Additionally, the pilot tone may be injected into fiber link 20 from light source 62B, thus propagating in the opposite direction with respect to the optical signal traffic.

Moreover, the ability of broadband receiver 64B to measure the optical power in each different wavelength optical probe may be used in combination with the known transmitted power of each optical probe to create accumulated Raman gain of fiber link 20. This is an option when the arrangement is provided as a distributed Raman amplifier, with the ability to test the span under different wavelength conditions providing the ability to see variations in gain as a function of wavelength. The distributed gain along the length of the span (at a given wavelength) will be evident from the complete span OTDR trace that is prepared by the paired combination of OTDR 60A, 60B.

Figure 11:
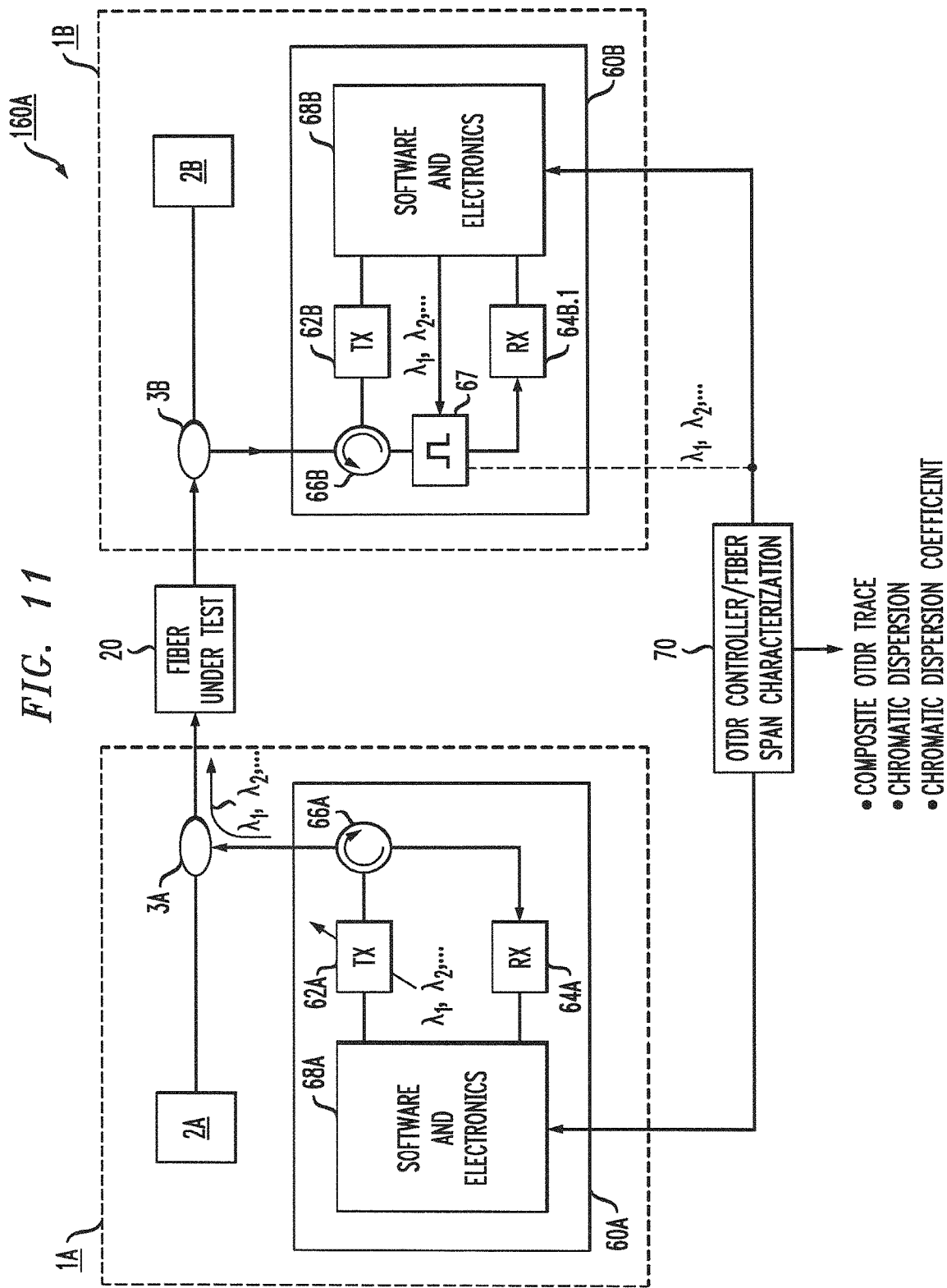
FIG. 11 shows a variant of the embodiment of FIG. 10, in this case using a tunable filter in combination with the receiver to provide wavelength-dependent power measurements

FIG. 11 illustrates a variation of the advanced OTDR system of FIG. 10, where in this case an advanced OTDR system 160A utilizes a tunable optical bandpass filter in combination of the far-end receiver so as to ensure that only a relatively narrow band surrounding each transmitted optical probe wavelength is measured at receiver 64B. Referring to the particulars of FIG. 11, a tunable wavelength filter 67 is used in combination with receiver 64B, where the tunable center wavelength of filter 67 is controlled in synchronization with the tuning of light source 62A so that receiver 64B is operating at the same wavelength as multi-wavelength light source 62A (and thus stepping through the same set of wavelength settings in synchronization with light source 62A). In particular, OTDR controller 70 may be used to provide wavelength control signals to both multi-wavelength light source 63A and receiver bandpass filter 67 such that both elements operate at the same wavelength at the same time.

Figure 12:
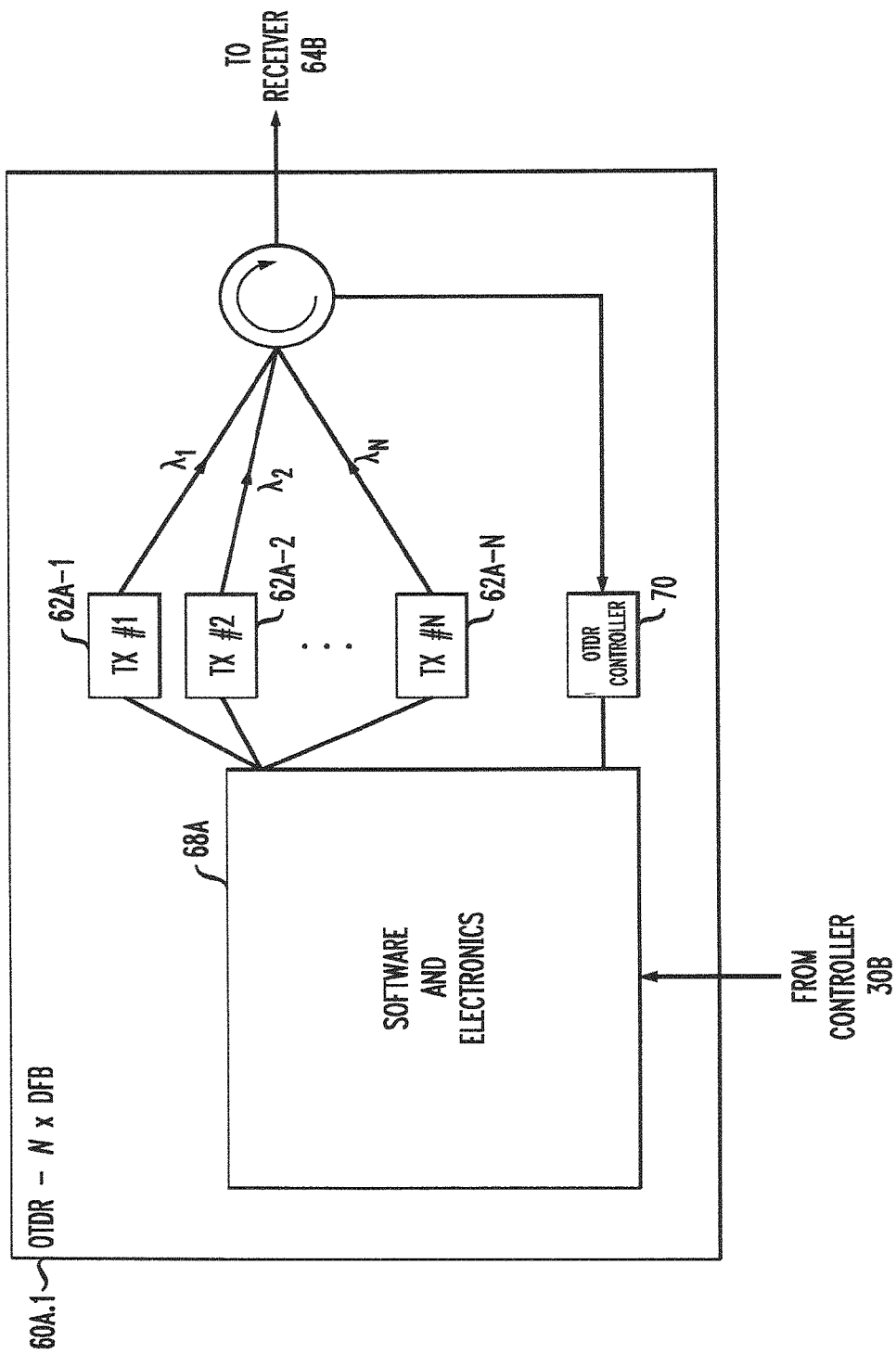
FIG. 12 shows a different type of multi-wavelength OTDR module that may be used in the embodiment of FIG. 10, in this case using a plurality of single-wavelength lasers for providing optical probe signals at different wavelengths.

Various arrangements may be used to form multi-wavelength light source 62A. FIG. 10 illustrates the use of a "tunable" laser source, which consists of a single laser source that may be controlled by an external signal (here, supplied by controller 70 via processing module 68A) to operate at a desired wavelength. FIG. 12 shows an alternative OTDR module, here noted as 60A.1, that utilizes an array of individual single-wavelength laser sources 62A-1, 62A-2, . . . , 6A2-N to provide a set of input optical probes at fixed wavelengths. As with the arrangement of FIG. 10, signals from controller 70 and/or processing module 68A may be used to control the wavelength sequence of the optical probes that are transmitted along the associated fiber span (not shown in FIG. 12). It is to be understood that this multi-source embodiment may also be used in combination with the tunable-wavelength receiver filter as shown in FIG. 11. For this combination, the command signals used to select the specific laser source is synchronized with the tuning of the filter's center wavelength.

The performance of optical communication systems is increasingly influenced by the polarization of the optical signals passing through the network. Additionally, the increasing length of fiber links within a network has brought attention to factors such as polarization-dependent loss (PDL), which is a known signal distortion that accumulates over distance and may have a deleterious impact on the transmitted optical signals.

Figure 13:
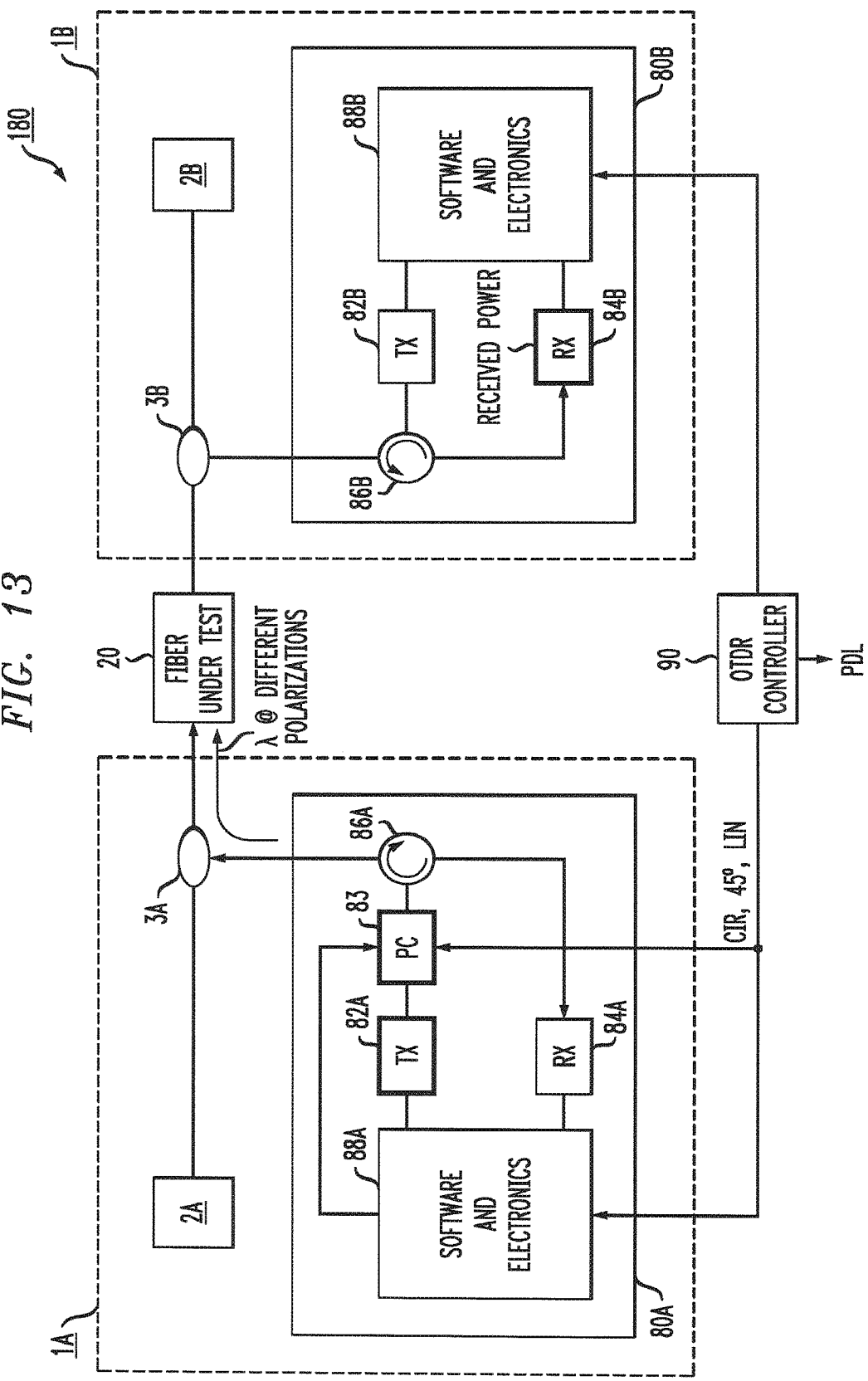
FIG. 13 illustrates another embodiment of the present invention, in this case including an adjustable polarization state controller that is used in combination with the optical probe signal to perform measurements of polarization-dependent loss (PDL) across the fiber span.

FIG. 13 illustrates an embodiment of the advanced OTDR system of the present invention, here denoted as advanced OTDR system 180, that is particularly configured to provide polarization-dependent loss measurements. As with the embodiments described above, advanced OTDR system 180 comprises a paired arrangement of OTDR modules 80A, 80B, with each module including a light source 82, receiver 84, and processing module 88 for use in generating conventional OTDR traces. Again, these traces may be stitched together in the manner outlined above to form an end-to-end OTDR trace of the complete span.

In this case of also providing polarization-dependent measurements, OTDR module 80A is shown as further including a polarization controller 83 that is positioned at the output of light source 82A (which in this instance is a "fixed wavelength" source, such as light source 12A of advanced OTDR system 100). An external fiber characterization module 90 is used in this embodiment to control polarization controller 83 so that the polarization state of the output optical probe from light source 82A steps through a complete sequence of polarizations. The control signals from module 90 may be directly received by polarization controller 83, or pass through processing module 88A as an intermediary component. Alternatively, processing module 88A itself may be configured to provide for a continuous movement/change in the polarization state of polarization controller 83.

Polarization-dependent loss, therefore, may be characterized by using receiver 84B to measure the received optical probe power. For the purposes of the present invention, polarization-dependent loss is defined as a measure of the peak-to-peak difference in transmission of an optical signal along the fiber span as the polarization is cycled through all possible polarization states. In most cases, it is defined as the ratio of the maximum and minimum signal powers, where $$PDL_{dB} = 10 * \log\left(\frac{P_{Max}}{P_{Min}}\right).$$

Figure 14:
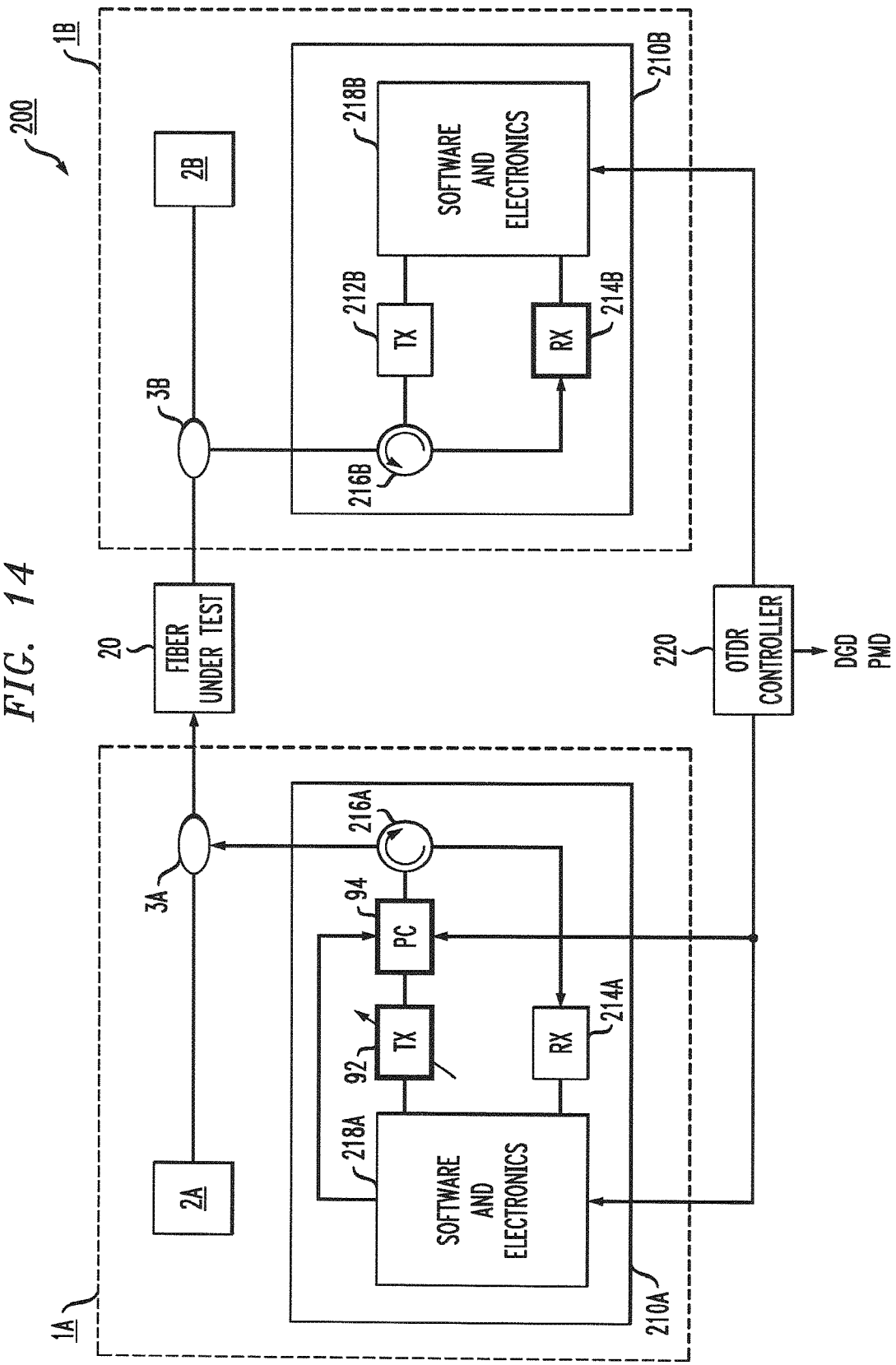
FIG. 14 depicts yet another embodiment of the present invention, incorporating the wavelength-dependent measurement capabilities of the embodiment of FIG. 10 with the polarization-dependent measurement capabilities of the embodiment in FIG. 13 where the ability to utilize both wavelength- and polarization-dependent measurements allows for the characterization of complex fiber qualities (such as, for example, differential group delay and polarization mode dispersion).

It is also possible to combine the multi-wavelength attributes of advanced OTDR system 160 with the polarization-dependent aspects of system 180 to create an advanced OTDR system 200, shown in FIG. 14 as including both a tunable wavelength light source 92 and a tunable polarizer 94. Beyond providing the results mentioned above, the collection of both wavelength-dependent dispersion and loss measurements in combination with polarization-dependent loss information over the tunable wavelength range allows for an associated fiber characterization module 210 to also develop differential group delay and polarization mode dispersion information for fiber link 20. This collection of information is extremely robust and well beyond the capabilities of a conventional OTDR system.

It is to be understood that the present invention may be embodied in various forms. Therefore, specific details disclosed herein are not to be interpreted as limiting, but rather as a basis for the claims and as a representative basis for teaching one skilled in the art to employ the present invention in virtually any appropriately-detailed optical communication system. While the invention has been described in connection with several preferred embodiments, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A system for characterizing an optical fiber span, comprising
   a near-end optical time domain reflectometer (OTDR) coupled to a near-end termination of the optical fiber span, the near-end OTDR including a near-end light source for injecting an optical probe into the optical fiber span, a near-end receive component for measuring a near-end back-reflected light exiting the optical fiber span, and a near-end processing module for generating a near-end OTDR trace of optical power loss along a y-axis as a function of the optical fiber span path length along an x-axis;
   a far-end OTDR coupled to a far-end termination of the optical fiber span, the far-end OTDR including a far-end light source for injecting an optical probe into the optical fiber span, a far-end receive component for measuring a far-end back-reflected light exiting the optical fiber span, and a far-end processing module for generating a far-end OTDR trace of optical power loss along a y-axis as a function of the optical fiber span path length along an x-axis, wherein the near-end and far-end processing modules are configured to control the activation of the near-end and far-end OTDRs such that only one OTDR is operational at any point in time, where both the near-end light source and the far-end light source operate at a same, single wavelength; and
   a characterization element in communication with both the near-end OTDR and the far-end OTDR, the characterization element configured to estimate a span-based parameter from a combination of the near-end back-reflected light measurements and the far-end back-reflected light measurements for then combining the near-end OTDR trace with the far-end OTDR trace in a trace-stitching procedure using a mid-point of the span-based parameter as a stitching point to create as an output an end-to-end OTDR trace that characterizes the optical fiber span.

2. A system as defined in claim 1, where both the near-end light source and the far-end light source generate a train of individual optical pulses as the optical probe, where the individual optical pulses are separated by a defined time interval used in generating an OTDR trace.

3. A system as defined in claim 1, where both the near-end light source and the far-end light source generate a continuous wave optical beam as the optical probe.

4. A system as defined in claim 1, where the characterization element is included within one or both of the near-end processing module and the far-end processing module.

5. A system as defined in claim 1, where the characterization element is a remote component that communicates with both the near-end processing module and the far-end processing module.

6. A system as defined in claim 1, where the near-end light source comprises a multi-wavelength optical light source, and the characterization element is further configured to provide a measurement of optical path length as a function of wavelength, based upon a transit time of the optical probe from the near-end multi-wavelength light source to the far-end receive component, the characterization element recording each estimated path length with an associated optical probe wavelength.

7. A system as defined in claim 6, where the characterization element is further configured to provide a measurement of optical power loss as a function of wavelength, based upon a difference between an input power of the optical probe at the near-end multi-wavelength light source and a received power at the far-end receive component, the characterization element recording each estimated power loss with an associated optical probe wavelength.

8. A system as defined in claim 6, where the near-end multi-wavelength light source comprises a plurality of separate lasers, each operating at a different, fixed wavelength, and a selector controlled by the characterization element utilized to energize each individual laser of the plurality of separate lasers in a defined sequence.

9. A system as defined in claim 6, where the near-end multi-wavelength light source comprises a tunable laser pulse source, providing an output pulse at a defined wavelength based on a control signal applied thereto.

10. A system as defined in claim 9, where the far-end OTDR further comprises a wavelength tunable filter disposed at an input to the far-end receive component to adjust a center wavelength of receive light measured by the far-end OTDR receive component.

11. A system as defined in claim 10, where the characterization element provides wavelength adjustment control signals to both the tunable laser source in the near-end OTDR and the wavelength tunable filter in the far-end OTDR.

* * * * *